April 3, 1962 T. P. BARNARD 3,027,749
BEARING TORQUE TEST INSTRUMENT
Filed Feb. 25, 1957 3 Sheets-Sheet 1

INVENTOR
THEODORE P. BARNARD
BY Pennie, Edmonds,
Morton, Barrows & Taylor
ATTORNEYS April 3, 1962 T. P. BARNARD 3,027,749
BEARING TORQUE TEST INSTRUMENT
Filed Feb. 25, 1957 3 Sheets-Sheet 2

SIGNAL GENERATOR
50

TORQUE GENERATOR
51

INVENTOR
THEODORE P BARNARD
BY Pennie, Edmonds
Morton, Barrows & Taylor
ATTORNEYS April 3, 1962  T. P. BARNARD  3,027,749
BEARING TORQUE TEST INSTRUMENT
Filed Feb. 25, 1957  3 Sheets-Sheet 3

INVENTOR
THEODORE P. BARNARD
BY Pennie, Edmonds
Morton, Barrows & Taylor
ATTORNEYS

United States Patent Office 3,027,749
Patented Apr. 3, 1962

3,027,749
BEARING TORQUE TEST INSTRUMENT
Theodore P. Barnard, Keene, N.H., assignor to Miniature Precision Bearings, Inc., Keene, N.H., a corporation of New Hampshire
Filed Feb. 25, 1957, Ser. No. 642,090
4 Claims. (Cl. 73—9)

The present invention relates to instruments for testing bearings of the type having inner and outer race members and rolling elements therebetween, and in particular to an instrument adapted to test such a bearing by providing an accurate measurement of the running torque transmitted from one race member to the other race member by imperfections in the coacting surfaces of the race members and rolling elements.

Specific bearing imperfections measurable by means of this running torque test include out-of-roundness, eccentricity, waviness, and finish of the coacting race member and rolling element surfaces. These imperfections are characterized by the production of pulses of transmitted torque. The frequencies of recurrence of the transmitted torque pulses extend through a range of up to approximately 20 cycles per second in accordance with the imperfections causing the pulses. Pulses due to out-of-roundness and eccentricity of the coacting surfaces are characterized by frequencies at the low end of this frequency range; pulses due to waviness are characterized by frequencies in the middle of the frequency range; and pulses due to finish are characterized by frequencies at the high end of the frequency range.

It is one of the objects of the present invention to provide a bearing test instrument capable of accurately measuring pulses of transmitted torque regardless of the frequency of pulse repetition.

To this end the instrument of this invention is adapted to apply a torque to one of the race members of a test bearing. The torque is transmitted from this driving race member through the rolling elements within the bearing to the other, or driven, race member causing the driven race member to rotate. Measurement of the transmitted torque is effected by means of a rotation-restraining system, analogous to a spring, which prevents further rotation of the driven race member at some equilibrium position displaced from its normal or null position. The torque required to maintain the driven race member at this equilibrium position is then indicative of the average transmitted torque or constant torque level produced by rolling friction and lubricant drag in the bearing. The surface imperfections producing the pulses of transmitted torque cause the driven race member to fluctuate about this equilibrium position in response to the action of the rotation-restraining system. A measurement of the instantaneous torque applied by the rotation-restraining system therefore provides an accurate indication of the magnitude of the transient pulses of transmitted torque and the average torque level about which they fluctuate.

In this instrument the range and linearity of frequency response to pulses of transmitted torque is proportional to the moment of inertia I, and the spring constant $k$, of the rotation-restraining system in accordance with the equation $T=2\pi\sqrt{I/k}$, where T is equal to the period of the system. Thus the lower moment of inertia, and the higher the spring constant, the greater the linear frequency range of the instrument. A large spring constant results in the loss of instrument sensitivity, however, and is therefore undesirable for many applications.

The present invention is featured by a rotation-restraining system the moving elements of which have an exceptionally low moment of inertia, thus permitting the spring constant of the system to be maintained low enough for optimum instrument sensitivity while providing a linear frequency response over the desired range of torque pulse repetition frequency.

To this end the bearing instrument is provided with a shaft adapted to mate with the inner race member of a test bearing. The shaft is rotatably mounted in a housing adapted to apply a torque to the outer, or driving, race member of the test bearing. The driving torque is thus transmitted through the bearing rolling elements to the inner, or driven, race member and thence to the shaft.

The rotation-restraining system includes an electrical signal generator. The rotor of this generator is mounted upon the shaft in coaxial symmetry therewith. The stator of the generator is mounted on the housing in operative relationship with the rotor. In this way the radius of gyration of the rotor about its centroidal axis is maintained as low as possible, thus providing a low moment of inertia.

The invention further provides a torsion element attached to the shaft and arranged in coaxial symmetry therewith. The torsion element is adapted to apply a restoring torque to the shaft in proportion to its angular displacement. The shaft is thus restrained at some equilibrium position indicative of the magnitude of the torque transmitted to the driven race member. To measure this torque the signal generator is adapted to produce an output voltage signal proportional to the angular displacement of its rotor.

The invention features two preferred embodiments of the aforesaid torsion element. The first embodiment employs an electrical torque generator to provide the required restoring torque. The rotor of the torque generator is mounted on the instrument shaft in coaxial symmetry therewith to maintain a low shaft moment of inertia. The stator of the torque generator is mounted on the housing in operative relationship with its rotor.

Electrical connecting means are then provided for applying the output signal from the signal generator to the torque generator. The torque generator is adapted to produce a restoring torque on its rotor proportional to this output signal. In this way the shaft is again restrained at an equilibrium position indicative of the magnitude of the torque transmitted to the driven race member.

A particular advantage of the above-described torsion element embodiment is that it permits adjustment of the spring constant $k$ through a range of values. This enables the choice of an optimum value of $k$ for the bearing being tested. Such adjustment is preferably effected by varying the value of electrical excitation applied to the stator of either the torque or signal generator.

The second embodiment employs a torsion wire having one end affixed to the shaft and the other end affixed to the housing. The wire is disposed substantially in alignment with the axis of the shaft. The torsion wire acts to apply a restoring torque to the shaft in proportion to its angular displacement, again restraining the shaft at an equilibrium position indicative of the magnitude of the torque transmitted to the driven race member.

A particular advantage of this second torsion element embodiment is the ensuing reduction of the mass of the instrument shaft. This results in a very low moment of inertia for the moving elements of the rotation-restraining system and therefore a higher instrument resonant frequency. For example, laboratory tests of an experimental instrument employing a torsion wire in accordance with the invention have resulted in measurements of approximately 50 cycles per second for the instrument resonant frequency. This is well above the maximum torque pulse repetition frequency of 20 cycles per second and assures substantially linear instrument operation up to this maximum figure.

The linear and wide frequency response afforded by the instrument of this invention permits the observation of bearing characteristics heretofore unobtainable with the instruments of the prior art. For example, the composite torque transmitted to the driven race member of the test bearing may be analyzed in terms of frequency by suitable filtering of the output signal of the instrument. This permits observation of the torque contribution due to the various bearing imperfections.

In a preferred embodiment of the electrical signal generator, and the torque generator as well, the stator comprises four symmetrically-disposed poles concentrically arranged about the associated rotor element. The rotor element is of magnetic material and is not permanently magnetized, nor does it carry any windings. It has two diametrically-opposed circular end portions, each substantially spanning the distance between the centers of two adjacent poles, the pole faces being formed to provide an accurately uniform air gap with relation to the ends of the rotor. Suitable windings are then provided about the stator poles of each generator in accordance with the function of the generator, the winding patterns being such that each rotor has a normal or neutral position with the edges of its circular end portions at the centers of the pole faces associated therewith. Suitable winding patterns for both the signal and torque generators are described in Patent No. 2,488,734, issued to R. K. Mueller on November 22, 1949, and entitled Dynamo Transformer.

This preferred signal generator embodiment provides a particularly important advantage in bearing torque measurement. The signal generator is thus sensitive only to angular displacement and not radial displacement. Off-center translation does not therefore affect the accuracy of the system, thus eliminating the necessity for maintaining very close and expensive tolerances.

The invention can best be understood by referring to the following drawings in which.

Figure 1:
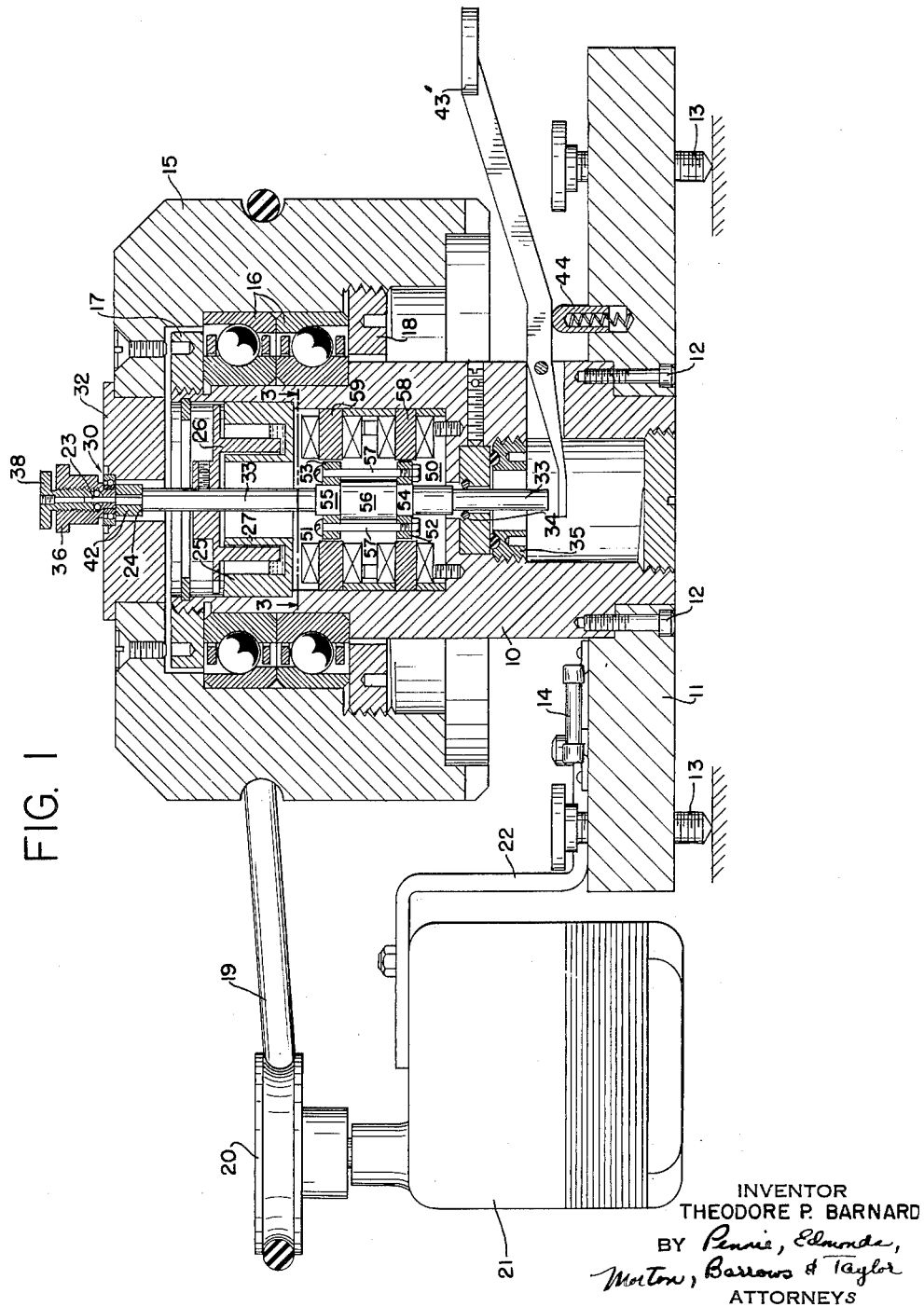
FIG. 1 is an elevation view partly in cross-section of one embodiment of the bearing torque test instrument of this invention.

Referring to FIG. 1 the torque test instrument comprises a cylindrical housing 10 perpendicularly supported upon a base 11 by means of screws 12. Leveling screws 13 and a level bubble 14 are provided to vertically orient housing 10. A rotor 15 is supported on housing 10 by means of bearings 16 and lock rings 17 and 18. Motor 21, pulley 20, and belt 19 are provided to drive the rotor 15. The motor 21 is supported on base 11 by means of bracket 22.

Figure 2:
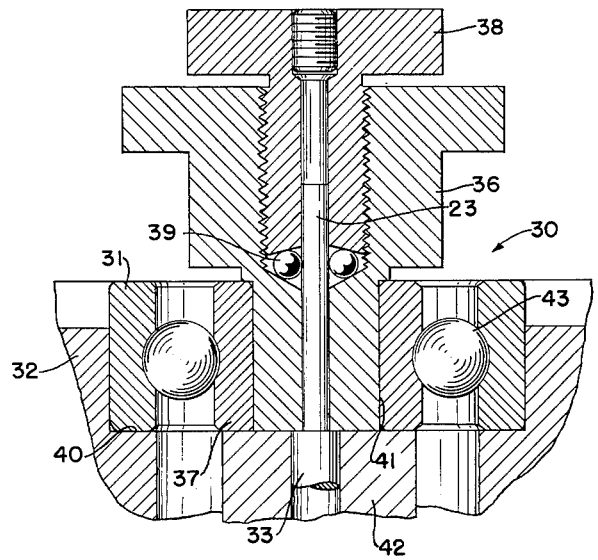
FIG. 2 is an enlarged cross-sectional view of the test bearing support employed in FIG. 1.

Torque from rotor 15 is applied to the outer race 31 of the test bearing 30 by means of adapter 32. As is best seen in FIG. 2 the outer race 31 of the bearing is seated upon shoulder 40 of adapter 32. The vertical inside diameter of shoulder 40 is accurately machined to snugly embrace the outer diameter of outer race member 31.

The bearings to be tested may vary in size of outer race outer diameter. In that event a variety of adapters having differently dimensioned inside diameters of shoulder 40 may be provided.

Shaft 33 is positioned in axial coincidence with housing 10 by means of a jewel assembly 34 and jewel lock ring 35, at one end, and shaft adapter 36 at the other end. Adapter 36 is provided to adjust the outside diameter of extension 23 of shaft 33 to the inside diameter of the test bearing inner race 37. In the event the test bearings vary in size, a variety of shaft adapters may be provided to adjust the shaft diameter to the inner race inner diameters of the various bearings to be tested.

The outside diameter 41 of shaft adapter 36 is accurately machined to mate snugly with the inside diameter of inner race member 37. Screw member 38 is threaded within adapter 36 to apply pressure against balls 39, which act like the jaws of a chuck to lock shaft 33 within adapter 36. This chuck-like assembly is employed to avoid the threading and consequent weakening of shaft extension 23 which may be quite small in diameter. In this manner any torque transmitted to inner race member 37 is applied through shaft adapter 36 to shaft 33.

The described shaft orienting means makes no provision for vertical support other than that supplied by shoulder 40 of rotor adapter 32 against outer race member 31. The entire weight of the shaft 33 and its accessories therefore rests upon the inner race 37 of bearing 30. Thus an axial thrust load is applied downwardly upon the bearing during the torque test in accordance with conventional testing standards. These standards may designate a number of values of thrust load. Means for the reception upon shaft 33 of calibrated weights, such as 42, is therefore provided in the form of a shoulder 24. It will be noted that weight 42 is oriented in coaxial relationship with shaft 33 so that its weight is distributed equally about the axis of the shaft thereby minimizing the moment of inertia of the rotating portion of the instrument.

Ejecting lever 43', pivoted onto spring 44, is provided to lift the shaft 33 so that the units mounted at the upper end of the shaft may be raised clear of rotor adapter 32 and easily removed.

Thus we see that in the present invention a torque is applied to the outer race 31 of test bearing 30 by means of rotor 15 through rotor adapter 32. As has been mentioned heretofore imperfections in the coacting surfaces of the bearing roller elements 43 and the inner and outer race members 37 and 31 will transmit a portion of the torque applied to the outer, or driving, race member 31 to the inner, or driven, race member 37. By means of shaft adapter 36 this transmitted torque is in turn applied from inner race member 37 to shaft 33. Thus a measurement of the torque applied to shaft 33 is indicative of this transmitted torque and therefore of imperfections in the test bearing.

Figure 3:
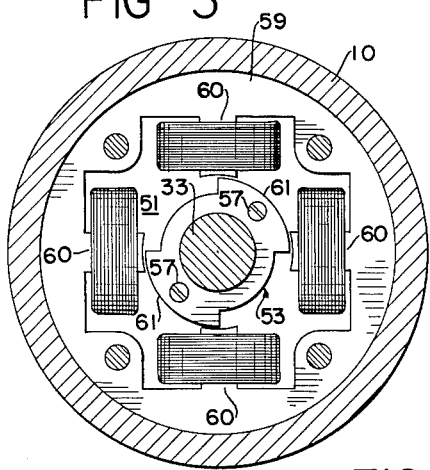
FIG. 3 is a view of the servoloop system employed in FIG. 1 taken along line 3—3.

The torque transmitted to shaft 33 is measured by means of a rotation-restraining system comprising a servoloop having a signal generator indicated generally at 50 and a torque generator indicated generally at 51. FIG. 3 is a view of the torque generator taken along line 3—3 of FIG. 1. Since the torque generator and the signal generator are identical in physical construction the view of the torque generator afforded by FIG. 3 will be adequate for a description of both.

Each generator has a rotor element, 52 in the signal generator and 53 in the torque generator. These rotors are mounted upon shaft 33 in coaxial symmetry therewith. The shaft is employed to transfer the transmitted torque from the driven race member to the generator rotors. The rotors are mounted on the shaft upon the shoulders provided by the large diameter portion 56 and smaller diameter portions 54 and 55 of shaft 33. The rotors are clamped against these shoulders by means of bolts 57.

Each generator also includes a stator, 58 in the signal generator and 59 in the torque generator. Each stator is attached to the housing 10 in operative relationship with its associated rotor element.

The coaxial orientation of rotors 52 and 53 with respect to shaft 33 is again intended for equal weight distribution about the shaft axis and minimization of the moment of inertia of the rotating parts. It will be noted that such coaxial orientation of shaft accessories is maintained throughout the instrument. A variety of signal and torque generators may be employed to perform the torque measuring function in the present invention. Applicable signal and torque generators are described in chapter 10, entitled Rotary Inductors, of Blackburn's "Components Handbook," vol. 17, of the Massachusetts Institute of Technology Radiation Laboratory Series.

Measurement of the transmitted torque applied to the shaft 33 is effected by the signal and torque generators in the following manner. The signal generator and torque generator both have a null or neutral position when not disturbed by the application of torque to the shaft. The signal generator 51 is adapted to produce an output signal in proportion to the angular displacement of its rotor 52. Thus when a torque is transmitted to the shaft 33 the rotation of the shaft, and consequently of the rotor 52, upsets the null balance of the signal generator and produces a signal proportional to the degree of angular displacement.

Suitable means are provided to apply this output signal to the torque generator 51. The torque generator is adapted to apply a restoring torque on its rotor 53 in proportion to the output signal from the signal generator. Thus the shaft 33, and consequently rotor 52, will be angularly displaced from the null position until the signal output to the torque generator has produced a restoring torque on rotor 53 equal and opposite to the transmitted torque. The equilibrium position of the shaft, or the output signal from the signal generator, is therefore indicative of the restoring torque which in turn is equal to the transmitted torque. Measurement of the output signal is, of course, the simplest of the possible alternatives of transmitted torque indication. Such measurement also permits the employment of a recording device for making a permanent record of the transmitted torque characteristic of the particular bearing being tested.

With a servoloop system comprising signal and torque generators it is possible to vary the spring constant $k$ of the rotation-restraining system by varying the excitation of either the torque or signal generator employed. This feature is particularly advantageous since the sensitivity of the instrument varies in inverse proportion to the spring constant $k$. Thus variation of the spring constant acts as an instrument sensitivity adjustment for a particular application or bearing.

A preferred construction of the signal and torque generators which has particular advantage in a bearing torque test application is illustrated in FIGS. 1 and 3. In this embodiment the rotor is made of magnetic material such as soft iron. The rotor is not permanently magnetized nor does it carry any windings. The stator is preferably constructed of laminations of magnetic material and has four symmetrically disposed, re-entrant poles 60, concentrically arranged about the rotor element associated therewith. The rotor has circular end portions 61, each of which substantially spans the distance between the centers of two adjacent poles. The pole faces are formed to provide accurately uniform air gaps with relation to the ends of the rotor.

Figure 4:
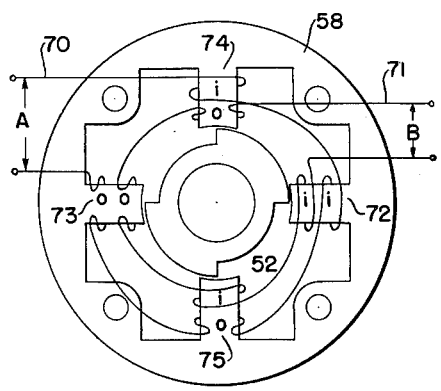
FIG. 4 is a schematic diagram of a signal generator winding pattern which may be employed in the servoloop system of FIG. 1.
Figure 5:
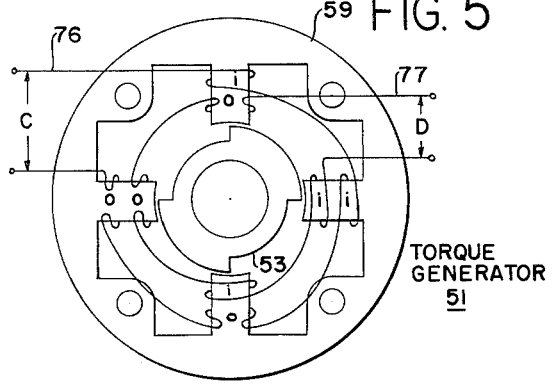
FIG. 5 is a schematic diagram of a torque generator winding pattern which may be employed in the servoloop system of FIG. 1.

FIGS. 4 and 5 represent stator windings for the signal generator and torque generator of the preferred servoloop embodiment. The stator windings illustrated in FIGS. 4 and 5 are by way of example only and are representative of a variety of windings that may be used to this purpose as more fully described in the hereinbefore noted Patent No. 2,488,734.

Each pole of the stator 58 of signal generator 50 is provided with a pair of windings 70 and 71. The two windings are connected to separate inputs indicated as inputs A and B. In the convention employed in FIGS. 4 and 5 the direction of magnetomotive force is inward toward the rotor when induced by a coil marked $i$, and outward away from the rotor when induced by a coil marked $o$. Thus the magnetomotive forces induced by the windings on the re-entrant poles 72 and 73 respectively, reinforce one another, while the combined electromotive force on pole 72 is opposite in direction to the combined electromotive force on pole 73. The windings on poles 74 and 75, respectively, are, however, coiled to induce canceling magnetomotive forces.

In operation of the signal generator 50 an alternating excitation voltage is applied to terminals A of primary winding 70. If the value of this excitation voltage is maintained constant the output signal at the terminals B of secondary winding 71 will be zero in value when the rotor is in its neutral or null position. This null position occurs when the edges of the rotor's circular end portions are located at the centers of the stator poles. If the rotor is moved the magnitude of the output signal will vary in proportion to the angular displacement of the rotor from neutral. The phase of this output signal differs by 180° depending upon the direction of angular displacement of the rotor from its neutral position.

The winding pattern of the torque generator 51 is identical to that of the signal generator 50. In this case, however, the excitation voltage is D.C. and is applied to the terminals C of primary winding 76. The input to the terminals D of the secondary winding 77 is also a D.C. voltage. The torque tending to move the rotor from its neutral position is proportional to the magnitude of the voltage applied to the winding 77 when the excitation voltage applied to winding 76 is maintained constant. In addition the direction of this torque varies with the polarity of the voltage applied to winding 77.

The operation of the servoloop with this particular winding arrangement therefore requires electrical connecting means for converting the A.C. signal appearing at the output of coil 71 into a D.C. voltage proportional thereto, and applying this voltage to coil 77 of the torque generator. The connecting means must also sense the phase of the A.C. output signal of the signal generator and produce a D.C. voltage having the proper polarity to apply a restraining torque to rotor 53 opposite in direction to the direction of rotation of rotor 52 of the signal generator.

Figure 6:
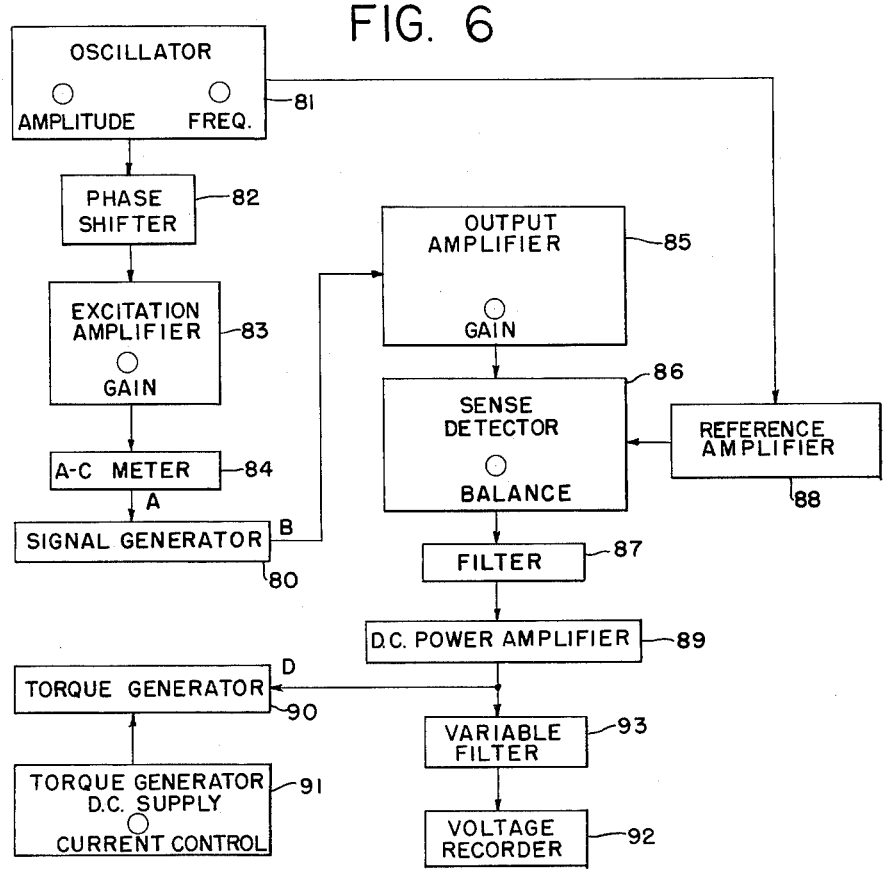
FIG. 6 is a block diagram of servoloop electrical components employed with the signal and torque generators of FIGS. 4 and 5.

Such connecting means is illustrated in block diagram form in FIG. 6. Excitation voltage to the signal generator 80 is supplied from oscillator 81 which has both amplitude and frequency controls. The output of the oscillator is applied through a phase shifter 82 to excitation amplifier 83 having a gain control associated therewith. The gain of the excitation amplifier may be metered by means of A.C. meter 84. This excitation voltage is applied to input terminals A of the primary winding of the signal generator 80.

The output of the signal generator is applied from terminals B of its secondary winding to output amplifier 85 having a gain control associated therewith. The output of amplifier 85 is then coupled into a sense detector circuit 86. The function of the sense detector is to provide in combination with filter 87 a D.C. output proportional to the A.C. output of amplifier 85, and to provide in combination with reference amplifier 88 a polarity shift of its D.C. output in accordance with a phase shift of the input from amplifier 85. The construction of such sense detecting circuits is well known in the art.

This D.C. output is then applied through D.C. power amplifier 89 to the terminals D of the secondary winding of the torque generator 90. A torque generator D.C. supply, having a current control associated therewith, is provided to supply excitation voltage to the terminals C of the primary winding of the torque generator 90. Thus the torque generator is provided with a constant D.C. supply from the primary, and a D.C. input to the secondary the magnitude and polarity of which causes a torque to be imparted to the rotor element of the torque generator which is opposite in direction and equal to the transmitted torque generating the output signal of the signal generator.

The current control adjustment provided in the torque generator D.C. supply 91 provides a simple means for varying the excitation of the torque generator and therefore the spring constant $k$ of the system. Such spring constant variation may also be effected by the gain control of the excitation amplifier 83 providing the alternating excitation voltage to the primary of the signal generator 80.

Indication of transmitted torque is effected by a measurement of the output signal from the signal generator by means of voltage recorder 92. Variable filter 93 is provided for analysis of the imperfections causing the transmitted torque. Thus if the percentage of transmitted torque contributed by out-of-roundness and eccentricity alone is required the variable filter may be adjusted to pass only the low frequency band of the total transmitted torque frequency range. Each torque contributing factor may be analyzed in a similar manner.

The signal and torque generator embodiment illustrated and described possesses features which are particularly advantageous in a bearing torque test instrument. Firstly, the sensing ability of this servoloop system to angular displacement is approximately six seconds of arc, thus providing the extreme sensitivity required in bearing torque tests.

Secondly, and of great importance, this servoloop system inherently has an inability to sense translation. This means that the torque tester mechanical drive units, even though imperfectly made, cannot create erroneous signals due to eccentricity, run-out, etc. Thus the time-consuming and expensive precision required to reduce these mechanical drive unit errors is eliminated by this feature.

It is interesting to note, however, that by tapping the windings at locations other than those employed for sensing and restoring angular deflections the signal generator of this system lends itself to the measurement of translatory errors in the mechanical drive units of the instrument. Thus the signal generator may be employed to align the shaft and its accessories. In addition this provides a means for reading bearing geometry errors completely separated from torque.

In the course of the development of the present invention it was found that the servoloop system had a tendency to oscillate, thus partially obscuring torque measurement. Such oscillation is conveniently eliminated by the provision of simple mechanical damping means, a preferred embodiment of which is illustrated in FIG. 1. The damping means comprises a cup 25 attached to housing 10 and partially filled with a linear viscous damping fluid. A cylindrical extension 26, attached to shaft 33, projects into the cup. The inner surface of extension 26 and the inner surface of wall 27 of the cup are dimensioned to provide approximately 0.010" clearance therebetween. The damping is effected by the fluid shearing required to move the extension relative to the cup and is proportional to the velocity. This type of damping has been found to be particularly effective in this invention.

Figure 7:
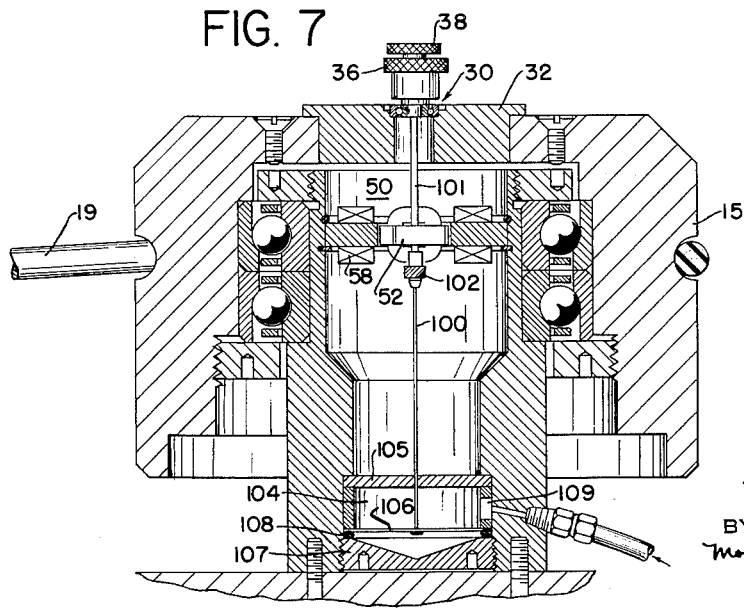
FIG. 7 is an elevation view partially in cross-section of another embodiment of the bearing torque test instrument of this invention.

Another embodiment of the invention is shown in FIG. 7 wherein components identical to those in FIG. 1 are similarly numbered. In this embodiment the torque generator 51 of FIG. 1 is replaced by a torsion wire 100 disposed substantially in alignment with the axis of shaft 101. One end of the torsion wire is affixed to the shaft by means of a collet 102. The other end of the torsion wire is affixed to the housing. A torsion wire develops a restoring torque in proportion to its angular displacement. Torsion wire 100 therefore performs the same function in the rotation-restraining system of the invention as does the torque generator 51 of FIG. 1.

The employment of a torsion wire for developing restoring torque materially reduces the mass of a shaft. This results in a still lower moment of inertia and a consequent increase in the resonant frequency of the instrument.

A signal generator indicated generally at 50 is again provided to produce an output signal proportional to the displacement of its rotor. Due to the action of the torsion wire this signal is indicative of the magnitude of the torque transmitted to the inner race member of the test bearing.

Considerably less auxiliary circuitry is required by the above-described embodiment than by the embodiment of FIG. 1. This is due to the fact that the signal generator does not now serve the dual function of providing both an input signal to the torque generator and an output signal representative of the magnitude of the transmitted torque, but simply the latter.

Additionally a damping system as in FIG. 1 need not be employed in the torsion wire embodiment.

It will be noted that there is no provision on shaft 101 for the reception of a calibrated weight (42 in FIG. 1). An alternative system for applying a designated thrust load on the test bearing, which system decreases the shaft moment of inertia by eliminating the mass of the weight, is shown in FIG. 7. The housing is adapted to include a fluid-tight chamber 104 by means of a sealed wall 105. A laterally-disposed diaphragm 106 of flexible material is attached to the housing about its periphery in a fluid-tight manner by means of lock nut 107 and O-ring 108. The torsion wire 101 is attached to the diaphragm through a fluid-tight opening in wall 105. Duct 109 is provided through the housing to introduce a pressure fluid, preferably compressed air, into the chamber. In this way the application of pressure fluid varies the position of the flexible diaphragm along the axis of the shaft, thus varying the tension force on the torsion wire and shaft. The thrust load on the bearing may therefore be varied simply by adjusting the fluid pressure introduced into the chamber.

Preferred embodiments of the invention have been described. Various changes and modifications, however, may be made within the scope of the invention as set forth in the appended claims.

I claim:

1. A bearing torque test instrument for testing a bearing having inner and outer race members and rolling elements disposed therebetween comprising a housing adapted to vertically support the outer race member of said test bearing, a shaft rotatably mounted within said housing, said shaft being adapted to mate with the inner race member of said test bearing and to suspend therefrom to apply an axial thrust load to said test bearing, driving means mounted on said housing and adapted to apply torque to the outer race member of said test bearing, whereby a transmitted torque is applied to the said inner race member and shaft from the said outer race member through the said rolling elements therebetween, a torsion element attached to said shaft and arranged in coaxial symmetry therewith, said element being adapted to apply a restoring torque to the said shaft in proportion to its angular displacement to restrain the said shaft at an equilibrium position indicative of the magnitude of said transmitted torque, an electrical signal generator having a rotor mounted on said shaft in coaxial symmetry therewith, and a stator mounted on said housing in operative relationship with said rotor, said signal generator being adapted to produce an output signal in proportion to the angular displacement of its rotor, means for measuring the said output signal from said signal generator, said output signal being representative of the magnitude of said transmitted torque, a fluid-tight chamber included in said housing, a diaphragm member within said chamber adapted and arranged to vary its position along the axis of said shaft in response to the fluid pressure within said chamber, the said shaft being affixed to said diaphragm member, and means for introducing a pressure fluid into said chamber to vary the tension force on said shaft.

2. A bearing torque test instrument for testing a bearing having inner and outer race members and rolling elements disposed therebetween comprising a housing, a shaft rotatably mounted within said housing and adapted to receive the inner race member of said test bearing, driving means mounted on said housing and adapted to apply torque to the outer race member of said test bearing, whereby a transmitted torque is applied to the said inner race member and shaft from the said outer race member through the said rolling elements therebetween, a torsion wire disposed substantially in alignment with the axis of said shaft with one end affixed to the said shaft and the other end to the said housing, said torsion wire being adapted to apply a restoring torque to the said shaft in proportion to its angular displacement to restrain the said shaft at an equilibrium position indicative of the magnitude of said transmitted torque, an electrical signal generator having a rotor mounted on said shaft in coaxial symmetry therewith, and a stator mounted on said housing in operative relationship with said rotor, said signal generator being adapted to produce an output signal in proportion to the angular displacement of its rotor, means for measuring the said output signal from said signal generator, said output signal being representative of the magnitude of said transmitted torque, a fluid-tight chamber included in said housing, a diaphragm member within said chamber adapted and arranged to vary its position along the said axis of said shaft in response to the fluid pressure within said chamber, the end of the said torsion wire affixed to said housing being attached to said diaphragm member, and means for introducing a pressure fluid into said chamber to vary the tension force on the said shaft.

3. A bearing torque test instrument for testing a bearing having inner and outer race members and rolling elements disposed therebetween comprising a housing, a shaft rotatably mounted within said housing and adapted to receive the inner race member of said test bearing, driving means mounted on said housing and adapted to apply torque to the outer race member of said test bearing, whereby a transmitted torque is applied to the said inner race member and shaft from the said outer race member through the said rolling elements therebetween, a torsion wire disposed substantially in alignment with the axis of said shaft with one end affixed to the said shaft and the other end to the said housing, said torsion wire being adapted to apply a restoring torque to the said shaft in proportion to its angular displacement to restrain the said shaft at an equilibrium position indicative of the magnitude of said transmitted torque, an electrical signal generator having a rotor mounted on said shaft in coaxial symmetry therewith, and a stator mounted on said housing in operative relationship with said rotor, said signal generator being adapted to produce an output signal in proportion to the angular displacement of its rotor, means for measuring the said output signal from said signal generator, said output signal being representative of the magnitude of said transmitted torque, and a variable filter circuit connected between said signal generator and said measuring means adapted to pass preselected frequency bands of the said output signal to the said measuring means.

4. A bearing torque test instrument for testing a bearing having inner and outer race members and rolling elements disposed therebetween comprising a housing adapted to vertically support the outer race member of said test bearing, a shaft rotatably mounted within said housing, said shaft being adapted to mate with the inner race member of said test bearing and to suspend therefrom to apply an axial thrust load to said test bearing, driving means mounted on said housing and adapted to apply torque to the outer race member of said test bearing, whereby a transmitted torque is applied to the said inner race member and shaft from the said outer race member through the said rolling elements therebetween, a torsion element attached to said shaft and arranged in coaxial symmetry therewith, said element being adapted to apply a restoring torque to the said shaft in proportion to its angular displacement to restrain the said shaft at an equilibrium position indicative of the magnitude of said transmitted torque, an electrical signal generator having a rotor mounted on said shaft in coaxial symmetry therewith, and a stator mounted on said housing in operative relationship with said rotor, said signal generator being adapted to produce an output signal in proportion to the angular displacement of its rotor, means for measuring the said output signal from said signal generator, said output signal being representative of the magnitude of said transmitted torque, a fluid-pressure chamber included in said housing, a diaphragm member within said chamber adapted and arranged to vary its position along the axis of said shaft in response to the fluid pressure within said chamber, the said shaft being affixed to said diaphragm member, and means for introducing a pressure fluid into said chamber to vary the tension force on said shaft.

References Cited in the file of this patent

UNITED STATES PATENTS

| | | |
|---|---|---|
| 2,002,372 | Greentree et al. | May 21, 1935 |
| 2,091,022 | Stuart | Aug. 24, 1937 |
| 2,398,156 | Puterbaugh et al. | Apr. 9, 1946 |
| 2,488,734 | Mueller | Nov. 22, 1949 |
| 2,660,885 | Evans | Dec. 1, 1953 |
| 2,700,298 | Anderson | Jan. 25, 1955 |
| 2,722,824 | Jensen et al. | Nov. 8, 1955 |
| 2,867,113 | Mims | Jan. 6, 1959 |